Feb. 20, 1951 R. R. TREXLER 2,542,219
LIQUID DISPENSING APPARATUS
Filed Oct. 18, 1943 2 Sheets-Sheet 2

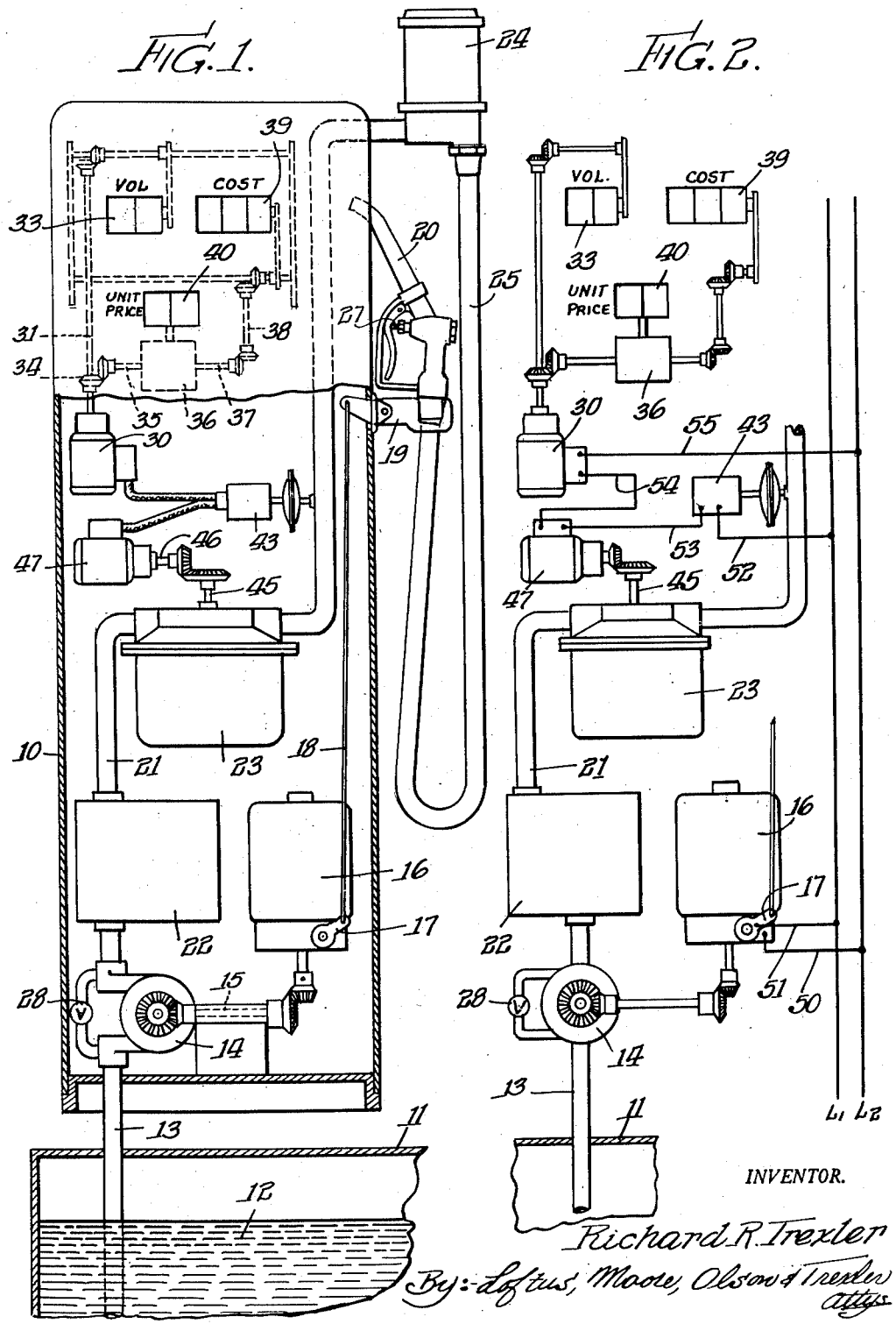

INVENTOR.
Richard R. Trexler
By:- Loftus, Moore, Olsen & Trexler
Attys.

Patented Feb. 20, 1951

2,542,219

UNITED STATES PATENT OFFICE 2,542,219

LIQUID DISPENSING APPARATUS

Richard R. Trexler, Evanston, Ill.

Application October 18, 1943, Serial No. 506,687

10 Claims. (Cl. 222—26)

This invention relates to liquid dispensing apparatus, and concerns more particularly the mechanisms for operating the volume and cost registers to effect the register of the volume and cost of the liquid dispensed.

It is an object of the invention to provide improved means and methods for effecting the operation of the cost and volume registers, in apparatus of the type defined.

More specifically stated, it is an object of the invention to provide improved electrical means for accurately operating cost and volume registers, or other registers, for registering or recording the desired functions of the liquid or commodity dispensed.

Still another object is to provide means whereby the register mechanism, such as cost and volume registers, may be operated at a point remotely located with respect to the dispensing apparatus, and in any number and arrangement.

Various other objects, advantages and features of the invention will be apparent from the following specification when taken in connection with the accompanying drawings, wherein certain preferred embodiments are set forth for purposes of illustration.

In the drawings, wherein like reference numerals refer to like parts throughout:

Fig. 1 is a general assembly view of a liquid dispensing apparatus constructed in accordance with and embodying the features of the invention;

Fig. 2 is a schematic and illustrative diagram of the apparatus of Fig. 1, more particularly illustrating the features of the invention.

Figure 3:
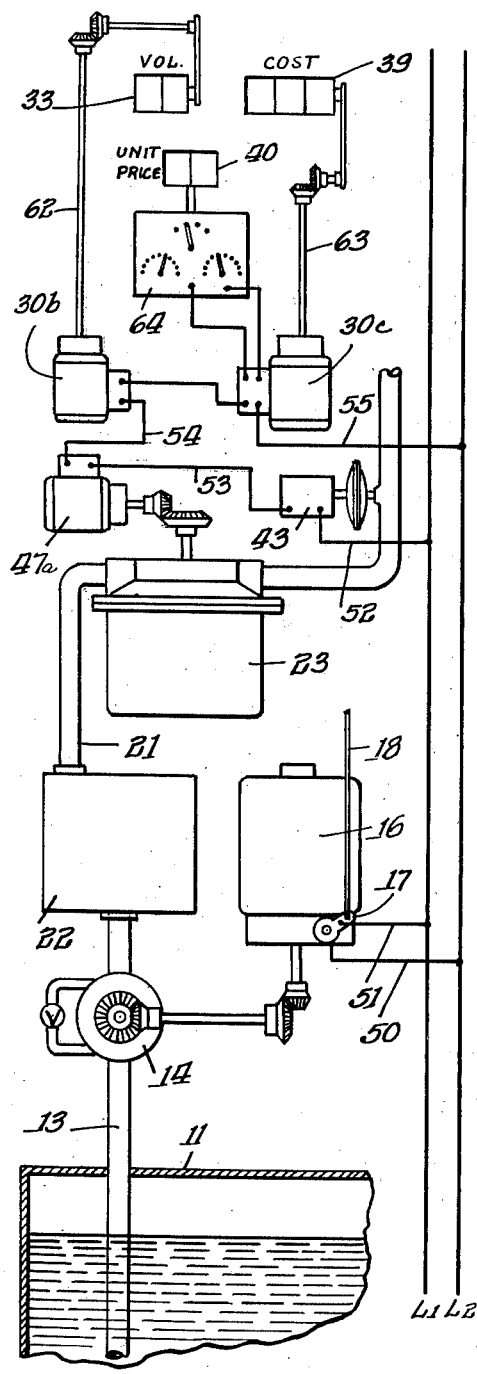
Figs. 2A and 3 are schematic and illustrative diagrams of modified forms of structure, constructed in accordance with the principles and features of the invention.

In the drawings, the invention has been illustrated as a part of a liquid dispensing apparatus such as employed for the dispensing of gasoline or the like, as certain features of the invention have particular applicability to an apparatus of this type.

Referring more specifically to the drawings, in Fig. 1 there is illustrated a liquid dispensing apparatus having a main casing 10 adapted to be associated with an underground tank 11 containing the body of liquid, such as indicated at 12, to be dispensed. A supply pipe 13 leads from the underground tank to a dispensing pump 14 adapted to be driven by means of drive connections 15 from an electric motor 16. The electric motor is provided with a switch 17 controlled from a rod 18, the upper end of which is connected to a support hook 19 adapted to support the usual dispensing nozzle 20 of the dispensing apparatus.

The pump 14 is adapted to propel the liquid outwardly through a dispensing line 21, which line has arranged therein an air eliminator 22, a meter 23, a sight gauge 24, and the usual flexible hose 25 connected with the dispensing nozzle 20.

As will be understood, when the nozzle 20 is removed from the support hook 19, and the hook raised, the motor 16 will be operated to actuate the pump 14 to thereby dispense liquid outwardly through the dispensing line upon the opening of the nozzle valve 27. The pump 14 includes the usual by-pass valve, as indicated at 28, whereby the pumped fluid may be by-passed when the pump is actuated and the nozzle valve 27 is closed.

In accordance with the principles of the present invention, means is provided for causing the meter to operate at a predetermined dispensing rate, at all times when the apparatus is in dispensing condition, and means is also provided for operating the volume and cost registers of the apparatus at the same rate, so that the values introduced into the registers correspond to the movements of the meter. However, the meter neither controls nor operates the registers as in the usual form of apparatus, but on the contrary, a common means is employed for controlling both the meter and the registers, whereby to provide synchronism of operation, any variation in operation of the control means being similarly introduced both into the operation of the meter and into the operation of the registers.

To this end, in accordance with the invention, means wholly independent of any drive by or from the meter is provided for driving the cost and volume registers. As illustrated in Figs. 1 and 2, this means comprises a self-starting synchronous motor 30 having a drive shaft 31 leading to and adapted to drive a volume register 33. Shaft 31 is also provided with a bevel gear 34 arranged to drive a shaft 35 leading to a variator 36, the output shaft 37 of which is adapted by means of drive connections 38 to operate a cost register, as indicated at 39. As will be understood, the variator, which may be of conventional mechanical construction, may be adjusted in accordance with the unit price of the gasoline, whereby the register 39 will compute the cost of the dispensed gasoline at any selected price per gallon. The variator 36 is connected with a unit price indicator, as shown at 40, whereby the price setting of the variator may be indicated to the consumer and the operator.

A pressure switch, as indicated at 43, is connected with and actuated by the pressure conditions within the dispensing line 21, the arrangement being such that the switch will be opened when the pressure in the line 21 reaches a predetermined value, and closed when the pressure in the line 21 drops below a predetermined value. As will later be more specifically described, the pressure switch 43 controls the energization of the self-starting synchronous motor 30, so that the motor is energized when the switch is closed and deenergized when the switch is open.

When the main dispensing pump 14 is in operation and the nozzle valve 27 is closed, pressure in the dispensing line 21 is maintained above the setting of the pressure switch 43, so that the pressure switch remains open. When the nozzle valve is opened, to dispense liquid, the pressure in the dispensing line 21 drops below the setting of the pressure switch 43, so that the pressure switch 43 is maintained closed continuously during the dispensing operation. Accordingly, it will be seen that when the nozzle valve 27 is open to dispense liquid, the motor 30 will be actuated to operate the volume and cost registers, whereas immediately as the nozzle valve is closed, the pressure switch 43 is operated to stop the motor 30, and thereby stop the operation of the register mechanisms.

In accordance with the invention, it is contemplated that the nozzle valve 27 will be of such type, including toggle mechanism, a snap cam, or the like, so as to either be fully open or fully closed at all times. When the nozzle valve is fully open, it will tend to permit the pumped liquid to be passed therethrough at an approximately constant predetermined dispensing rate.

The meter shaft 23 is provided with a drive shaft 45 connected by means of drive mechanism 46 to a self-starting, synchronous, rotary electrical controller 47. This unit is structurally a synchronous motor, but because it functions at times as a motor and at times as a generator, may for convenience be referred to as a motor-generator. It is controlled by the pressure switch 43, the arrangement being such that the motor-generator is energized when the switch is closed and deenergized when the switch is open. The function of the motor-generator 47 is to maintain the speed of operation of the meter 23 at a predetermined value, as will later be more specifically explained. As will be understood, both the motor-generator 47 and the motor 30 may be provided with suitably built-in reduction gearing.

Referring to Fig. 2, which shows a schematic or diagrammatic layout of the apparatus illustrated in Fig. 1, it will be seen that the switch 17 for the motor 16 is connected directly to the lines $L_1$ and $L_2$ by means of a pair of wires 50 and 51, the arrangement being such that when the switch 17 is closed, the electric motor 16 is energized. Pressure switch 43 is connected to the line $L_1$ by means of a wire 52. A wire 53 leads from the switch 43 to the self-starting synchronous motor-generator 47. A line 54 leads from said motor-generator to the self-starting synchronous motor 30, and the line 55 leads back from the motor 30 to the line $L_2$. It will be seen that when the pressure switch 43 is closed, the motor-generator 47 and the motor 30 will be energized.

As known, a synchronous motor or motor-generator, if not overloaded beyond a predetermined amount, operates at synchronous speed proportional to the electrical frequency in the power lines to which it is connected. In accordance with the present invention, it will be seen that the synchronous motor-generator 47 and the synchronous motor 30 are both connected to the same power lines $L_1$ and $L_2$. Accordingly, any frequency variations which occur in the power lines will be transmitted simultaneously both to the motor-generator 47 and to the motor 30, thereby producing like variations in the operation of both units. In other words, any variations in the speed of operation of the synchronous motor 30, due to frequency variations in the power lines, will also be transmitted to the motor-generator unit 47, which controls the operation of the meter 23. By this means, correspondence of movement in the meter and the registers is maintained.

The unit 47 has been heretofore referred to as a self-starting synchronous motor-generator. More specifically, it is contemplated that this unit will be a relatively small self-starting synchronous motor, sufficient only to maintain the meter speed in direct relation to the synchronous speed of operation of the motor 47. In other words, the meter 23 will be driven substantially at the desired dispensing rate, for example, 10 gallons per minute, by the liquid propelled through the dispensing line from the pump 14. However, should variations in the flow rate tend to occur, for example, because of variations in the liquid level of the underground tank, or other causes, the unit 47 will tend to be driven as a generator, if the speed of operation of the meter tends to increase, or as a motor, if the speed of operation of the meter 23 tends to lag, whereby to constantly maintain the meter speed proportional to the synchronous operating speed of the synchronous unit 47. The unit 47 need be only a small synchronous unit, as it operates merely as a compensator or control for the speed of operation of the meter 23, the principal actuating power for the meter coming from the liquid propulsion in the dispensing line.

Similarly, the synchronous motor 30 need be only a relatively small motor of sufficient power only to drive the relatively light register mechanisms. By having the units of self-starting type, their operation will be initiated immediately upon the opening of the nozzle valve and the actuation of the pressure switch 43, whereby to minimize lag in the operation of the structures.

Figure 2A:
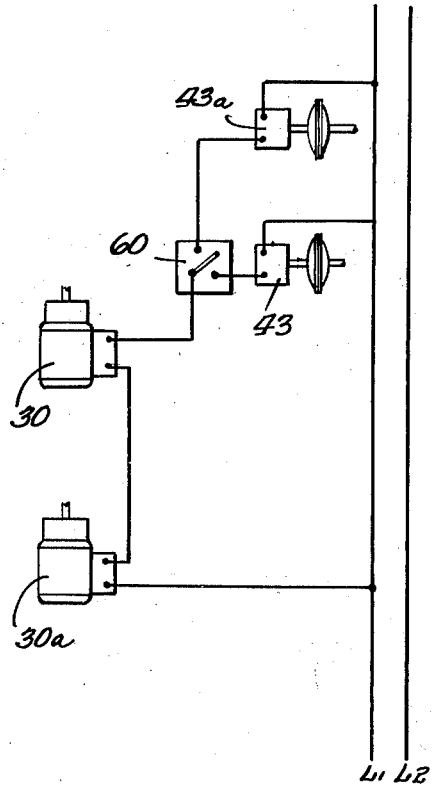

It will be seen that any variations in power line frequency or voltage will be transmitted uniformly to both the unit 30 and the unit 47, whereby to maintain synchronism of operation between the meter 23 and the registers 33 and 39. While, in Fig. 1, the registers have been shown as embodied in the same housing as the remaining elements of the dispensing apparatus, it will be seen that in accordance with the principles of the invention, the registers and their associated driving motor 30 may be remotely positioned with respect to the dispensing line, or several motors 30 and associated registers may be provided, controlled from a single dispensing apparatus or pressure switch 43. It will thus be seen that in accordance with the invention, one or more remotely positioned register units may be controlled from the same dispensing line, or conversely, several dispensing lines may be selectively connected to the same register. This may be accomplished, in each instance, merely by providing suitable electrical connection between the motor or motors 30 and the switch or switches 43, so that any one or more motors may be selectively coupled to any one or more dispensing apparatus. In Fig. 2A, for example, a pressure switch is indicated as being operable to control two register motors 30 and 30a connected in series relationship. Also, a second pressure switch 43a is illustrated, which may be used as the control medium selectively in place of the switch 43, under the control of a selector switch 60.

In Fig. 3 an embodiment of the invention is illustrated which is the same as that shown in Figs. 1 and 2 except that the rotary electrical controller or motor-generator for controlling the speed of operation of the meter is structurally a self-starting induction type motor, as indicated at 47a, rather than a self-starting synchronous unit. Also, the manner of operation of the register mechanism is different. In this instance, instead of utilizing a single self-starting synchronous motor for driving the volume and cost registers, as in Figs. 1 and 2, two independent self-starting induction motors 30b and 30c are employed, having the same electrical characteristics of operation as the induction motor 47a. The motor 30b is independently connected to the volume register 33 by drive connections 62, whereas the motor 30c is independently connected to the cost register 39 by drive connections 63. The motors 30b and 30c are in series relationship, so that both are simultaneously energized from the pressure controlled switch 43. Instead of using a mechanical type variator, as in the case of variator 36 in Figs. 1 and 2, an electrical control rheostat 64 is employed, calibrated in terms of unit cost, and connected to the unit price indicator 40, and arranged to electrically control the speed of operation of the motor 30c. It will be seen that in this embodiment the motor 30b operates the volume register, whereas the motor 30c operates the cost register, and may be varied as to speed of operation in accordance with unit cost. An induction type motor such as indicated at 30c may be controlled as to speed by suitable means, such, for example, as the rheostat 64.

By making the electrical units 47a, 30b and 30c all of the same type, in the present instance, self-starting induction type units, any variations in electrical frequency, voltage, etc. in the power lines L1 and L2 will be equally reflected in the operating characteristics of all of the electrical units, whereby to maintain the registers and meter in synchronism of operation.

It is obvious that various changes may be made in the specific embodiments set forth without departing from the spirit of the invention. The invention is accordingly not to be limited to the precise embodiments shown and described, but only as indicated in the following claims.

The invention is hereby claimed as follows:

1. A liquid dispensing apparatus comprising a dispensing line adapted to be connected to a source of liquid supply, a pump arranged to propel liquid through the dispensing line, a relief valve in the dispensing line in by-pass relation to the pump, means for driving the pump, a meter in the dispensing line movable in proportion to the liquid flow through the line, a rotary electrical controller for controlling the speed of operation of the meter, register mechanism for registering a function of the dispensed liquid, and a rotary electrical controller for operating said registering mechanism, both of said controllers being connected to a common power line for actuation.

2. A liquid dispensing apparatus comprising a dispensing line adapted to be connected to a source of liquid supply, a pump arranged to propel liquid through the dispensing line, means for driving the pump, a meter in the dispensing line movable in proportion to the liquid flow through the line, a rotary electrical controller for controlling the speed of operation of the meter, register mechanism for registering a function of the dispensed liquid, and a rotary electrical controller for operating said registering mechanism, both of said controllers having similar electrical characteristics of operation and being connected to a common power line for actuation.

3. A liquid dispensing apparatus as defined in claim 2, wherein said controllers are self-starting synchronous type units.

4. A liquid dispensing apparatus comprising a dispensing line adapted to be connected to a source of liquid supply, a pump arranged to propel liquid through the dispensing line, means for driving the pump, a meter in the dispensing line movable in proportion to the liquid flow through the line, a rotary electric controller for controlling the speed of operation of the meter, register mechanism for registering a function of the dispensed liquid, a rotary electrical controller for operating said registering mechanism, both of said controllers being connected to a common power line for actuation, and a pressure switch controlled by the pressure in the dispensing line for controlling the operation of at least one of said controllers.

5. A liquid dispensing apparatus comprising a dispensing line adapted to be connected to a source of liquid supply, a pump arranged to propel liquid through the dispensing line, means for driving the pump, a meter in the dispensing line movable in proportion to the liquid flow through the line, a rotary electrical controller for controlling the speed of operation of the meter, register mechanism for registering a function of the dispensed liquid, a rotary electrical controller for operating said registering mechanism, both of said controllers being connected to a common power line for actuation, and a pressure switch controlled by the pressure in the dispensing line for simultaneously controlling the operation of both said controllers.

6. A liquid dispensing apparatus comprising a dispensing line adapted to be connected to a source of liquid supply, a pump arranged to propel liquid through the dispensing line, means for driving the pump, a meter in the dispensing line movable in proportion to the liquid flow through the line, a rotary electrical controller for controlling the speed of operation of the meter, register mechanism including a volume register and a cost register, and a rotary electrical controller for operating said register mechanism, both of said controllers being connected to a common power line for actuation.

7. A liquid dispensing apparatus comprising a dispensing line adapted to be connected to a source of liquid supply, a pump arranged to propel liquid through the dispensing line, means for driving the pump, a meter in the dispensing line movable in proportion to the liquid flow through the line, a rotary electrical controller for controlling the speed of operation of the meter, register mechanism including a pair of registers for registering functions of the dispensed liquid, and rotary electrical controllers for operating each of said registers, all of said controllers being connected to a common power line for actuation.

8. A liquid dispensing apparatus as defined in claim 7, wherein means is provided for electrically varying the speed of operation of at least one of said register operating controllers.

9. A liquid dispensing apparatus comprising a dispensing line adapted to be connected to a source of liquid supply, a pump arranged to propel liquid through the dispensing line, means for driving the pump, a meter in the dispensing line movable in proportion to the liquid flow through the line, a rotary electrical controller for controlling the speed of operation of the meter, register mechanism for registering a function of the dispensed liquid, a rotary electrical controller for operating said registering mechanism, both of said controllers being connected to a common power line for actuation, and means for electrically varying the speed of operation of the register operating controller.

10. A liquid dispensing apparatus comprising a dispensing line adapted to be connected to a source of liquid supply, a liquid displacement mechanism disposed in the dispensing line, said mechanism having a rotary shaft operable in proportion to the volume of liquid displaced through said mechanism, a rotary electrical controller for controlling the speed of operation of said shaft, register mechanism for registering a function of the dispensed liquid, a rotary electrical controller for operating said registering mechanism, both of said controllers being connected to a common power line for actuation, a nozzle valve interconnected with the terminal end of the dispensing line for controlling liquid flow through the line, and common control means for both of said electrical controllers for effecting the energization and deenergization thereof, said control means being controlled by the operation of said nozzle valve.

RICHARD R. TREXLER.

REFERENCES CITED

The following references are of record in the file of this patent:

UNITED STATES PATENTS

| Number | Name | Date |
| --- | --- | --- |
| 1,974,857 | Winton | Sept. 25, 1934 |
| 2,018,538 | Webb | Oct. 22, 1935 |
| 2,117,750 | Svenson | May 17, 1938 |
| 2,151,239 | Slye et al. | Mar. 21, 1939 |
| 2,296,540 | Schurz | Sept. 22, 1942 |
| 2,319,444 | Crosby | May 18, 1943 |